United States Patent [19]
Cairns

[11] Patent Number: 5,930,703
[45] Date of Patent: Jul. 27, 1999

[54] METHODS AND SYSTEMS FOR PROGRAMMING A CELLULAR RADIOTELEPHONE

[75] Inventor: Steven G. Cairns, Louisburg, N.C.

[73] Assignee: Ericsson Inc., Research Triangle Park, N.C.

[21] Appl. No.: 08/619,175

[22] Filed: Mar. 21, 1996

[51] Int. Cl.⁶ .............................. H04M 3/00; H04M 1/00; H04Q 7/20

[52] U.S. Cl. .......................... 455/418; 455/564; 455/426; 379/355

[58] Field of Search ..................................... 455/419, 418, 455/403, 564, 551, 410, 88, 517, 575; 395/200.42, 200.43, 200.46, 200.47, 200.49, 200.6, 200.62; 379/444, 443, 355, 356, 433

[56] References Cited

U.S. PATENT DOCUMENTS

| | | | |
|---|---|---|---|
| 4,534,012 | 8/1985 | Yokozawa | 368/327 |
| 4,811,377 | 3/1989 | Krolopp et al. | 455/410 |
| 5,062,132 | 10/1991 | Yasuda et al. | 455/418 |
| 5,127,040 | 6/1992 | D'Avello et al. | 455/419 |
| 5,276,729 | 1/1994 | Higuchi et al. | 455/564 |
| 5,297,191 | 3/1994 | Gerszberg | 455/419 |
| 5,335,261 | 8/1994 | Fujinaka | 455/563 |
| 5,485,505 | 1/1996 | Norman et al. | 455/551 |
| 5,493,604 | 2/1996 | Hirayama | 455/564 |
| 5,535,147 | 7/1996 | Jacobs et al. | 364/705.07 |
| 5,570,297 | 10/1996 | Brzezinski et al. | 395/112 |
| 5,603,084 | 2/1997 | Henry, Jr. et al. | 455/419 |
| 5,675,630 | 10/1997 | Beatty | 455/564 |
| 5,812,946 | 9/1998 | Nakabayashi et al. | 455/418 |

FOREIGN PATENT DOCUMENTS

| | | |
|---|---|---|
| 4130024A1 | 4/1992 | Germany . |
| 2251357 | 7/1992 | United Kingdom . |
| 2256113 | 11/1992 | United Kingdom . |
| 2283151 | 4/1995 | United Kingdom . |
| WO 94/05101 | 3/1994 | WIPO . |
| WO 95/03677 | 2/1995 | WIPO . |

OTHER PUBLICATIONS

International Search Report, PCT/US 97/04570, Aug. 22, 1997.

*Primary Examiner*—Dwayne D. Bost
*Assistant Examiner*—Tracy M. Legree
*Attorney, Agent, or Firm*—Myers Bigel Sibley & Sajovec

[57] ABSTRACT

A directory of telephone numbers is entered into a cellular radiotelephone by entering the directory into a terminal, transferring the directory from the terminal to the radiotelephone via a wireless coupling, and programming the directory into a memory of the cellular radiotelephone. The radiotelephone preferably includes an acoustic output transducer, an acoustic input transducer, a transceiver, a memory, a wireless coupling for receiving a data signal including the directory of telephone numbers, and a processor for programming the directory in the memory. The terminal is preferably a system including an input device for accepting entry of the directory, a processor for converting the directory into a data signal which can be transferred to the radiotelephone and an acoustic output transducer for transferring the data signal to the radiotelephone where the directory of telephone numbers can be programmed into memory.

19 Claims, 5 Drawing Sheets

METHODS AND SYSTEMS FOR PROGRAMMING A CELLULAR RADIOTELEPHONE

FIELD OF THE INVENTION

The invention relates to the field of cellular radiotelephones, and more particularly to cellular radiotelephones with programmable memories.

BACKGROUND OF THE INVENTION

Modern cellular radiotelephones provide a high degree of convenience for the mobile user. As the technology has advanced, the size of radiotelephones has decreased to the point that many fit in a shirt pocket. Furthermore, currently available batteries allow these pocket sized radiotelephones to operate up to 24 hours.

Despite the reductions in size, the functionality of radiotelephones has increased. For example, a programmable telephone directory is a common feature on many radiotelephones today. Such a telephone directory allows the user to program in a predetermined number of telephone numbers and names (and/or other identifiers) associated with the telephone numbers. Accordingly, the user can program frequently used telephone numbers into the phone and retrieve a desired number using an associated name or other identifier, thereby eliminating the need to remember a particular number. Once retrieved, the cellular radiotelephone can automatically dial the number.

Many cellular radiotelephones have the capacity to program up to 100, and even as many as 250, telephone numbers. The radiotelephone keypad, however, is typically limited to fewer keys than there are letters so that a single key is used to input multiple letters. Furthermore, the display on most radiotelephones has only one or a few lines and may not provide enough characters to simultaneously display both a complete name and number. For these reasons, programming a large number of telephone numbers can be difficult and time consuming.

Accordingly, there continues to exist a need in the art for a cellular radiotelephone with a programmable memory which can be easily programmed.

SUMMARY OF THE INVENTION

It is therefor an object of the present invention to provide an improved cellular radiotelephone.

It is another object of the present invention to provide an improved method for programming a cellular radiotelephone.

These and other objects of the present invention are provided by a cellular radiotelephone with a directory of telephone numbers which can be programmed through the microphone via a wireless acoustic coupling path. Accordingly, acoustic signals including the telephone directory information can be provided by a computer terminal including a speaker. The user of the radiotelephone can thereby enter the directory of telephone numbers and associated names into the computer terminal which in turn generates an acoustic output signal which is transmitted by the speaker. The user can easily enter and edit the directory using the full size keyboard and screen of the computer terminal, eliminating the need to program the directory through the radiotelephone keypad. Furthermore, this programming feature can be implemented without adding significant cost or complexity to the manufacture of the radiotelephone. Alternately, a directory of telephone numbers from a first radiotelephone can be copied into a second radiotelephone by coupling the speaker of the first radiotelephone with the microphone of the second.

A method for providing the directory of telephone numbers includes the steps of entering the directory into a terminal, transferring the directory from the terminal to the cellular radiotelephone via a wireless coupling, and programming the directory of telephone numbers into a memory of the cellular radiotelephone. The terminal is preferably a personal computer including a speaker which is readily available to many consumers, and the wireless coupling preferably comprises an acoustic coupling between the speaker of the personal computer and a microphone of the cellular radiotelephone.

The transferring step can be preceded by the steps of transferring a known test data pattern from the terminal to the radiotelephone via the wireless coupling, and indicating successful receipt of the data pattern at the cellular radiotelephone. The user can thus confirm operation of the wireless coupling prior to transferring the directory of telephone numbers. If the data pattern is not successfully received, the radiotelephone can be moved closer to the terminal and/or the transmission speed can be reduced, and the test data pattern resent.

The directory of telephone numbers preferably includes a plurality of alpha-numeric character groups wherein each of the alpha-numeric character groups corresponds to a respective one of the telephone numbers. In many radiotelephones, the memory can accommodate a directory with over one hundred entries. Accordingly, the user can preferably edit the directory of telephone numbers at the terminal after entry. This step allows the user to more easily make changes and corrections to the directory when needed.

A computer system for programming a directory of telephone numbers into a cellular radiotelephone includes input means for accepting entry of the directory by a user, processing means for converting the directory into a data signal which can be transferred to the radiotelephone, and wireless coupling means for transferring the data signal from the computer system to the radiotelephone. The directory can then be programmed into memory of the cellular radiotelephone for future use. The computer system may also include testing means for transferring a data signal including a known test data pattern from the computer system to the radiotelephone. Accordingly, the wireless coupling can be verified prior to sending the directory of telephone numbers.

The computer system also preferably includes editing means for accepting editing of the directory of telephone numbers by the user. Accordingly, the user can easily make changes to the directory. In addition, the directory can be saved at the computer system, edited at a later time, and then used to reprogram the radiotelephone.

Alternately, user programmable data can be copied from a first memory of a first cellular radiotelephone to a second memory of a second radiotelephone. The user programmable data is transferred from the first cellular radiotelephone to the second radiotelephone via a wireless coupling and the second memory of the second radiotelephone is programmed with the user programmable data. Accordingly, a user can copy his directory of telephone numbers from an old radiotelephone to a new radiotelephone without entering the data through the keypad.

The transferring step can include converting the user programmable data in the first radiotelephone to an acoustic data signal, transmitting the acoustic data signal from a speaker of the first radiotelephone, receiving the acoustic data signal at the microphone of the second radiotelephone, and reconverting the received acoustic data signal back to the user programmable data within the second radiotelephone. As before, operation of the wireless coupling can be confirmed by transferring a known test data pattern prior to transferring the user programmable data.

Accordingly, the radiotelephone and related methods of the present invention eliminate the need to enter a lengthy directory of telephone numbers into a radiotelephone via the keypad. Instead, the directory can be entered into, edited and saved on a computer terminal, and then transferred to the radiotelephone via the wireless coupling. By coupling the directory information to the microphone of the radiotelephone, no extra hardware is required to implement the invention on existing cellular radiotelephones. The modem function of the radiotelephone can be provided by programming existing hardware. Alternately, a directory of telephone numbers can be copied from a first radiotelephone to a second radiotelephone by coupling the two radiotelephones from speaker to microphone.

DETAILED DESCRIPTION

The present invention will now be described more fully hereinafter with reference to the accompanying drawings in which preferred embodiments of the invention are shown. The present invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
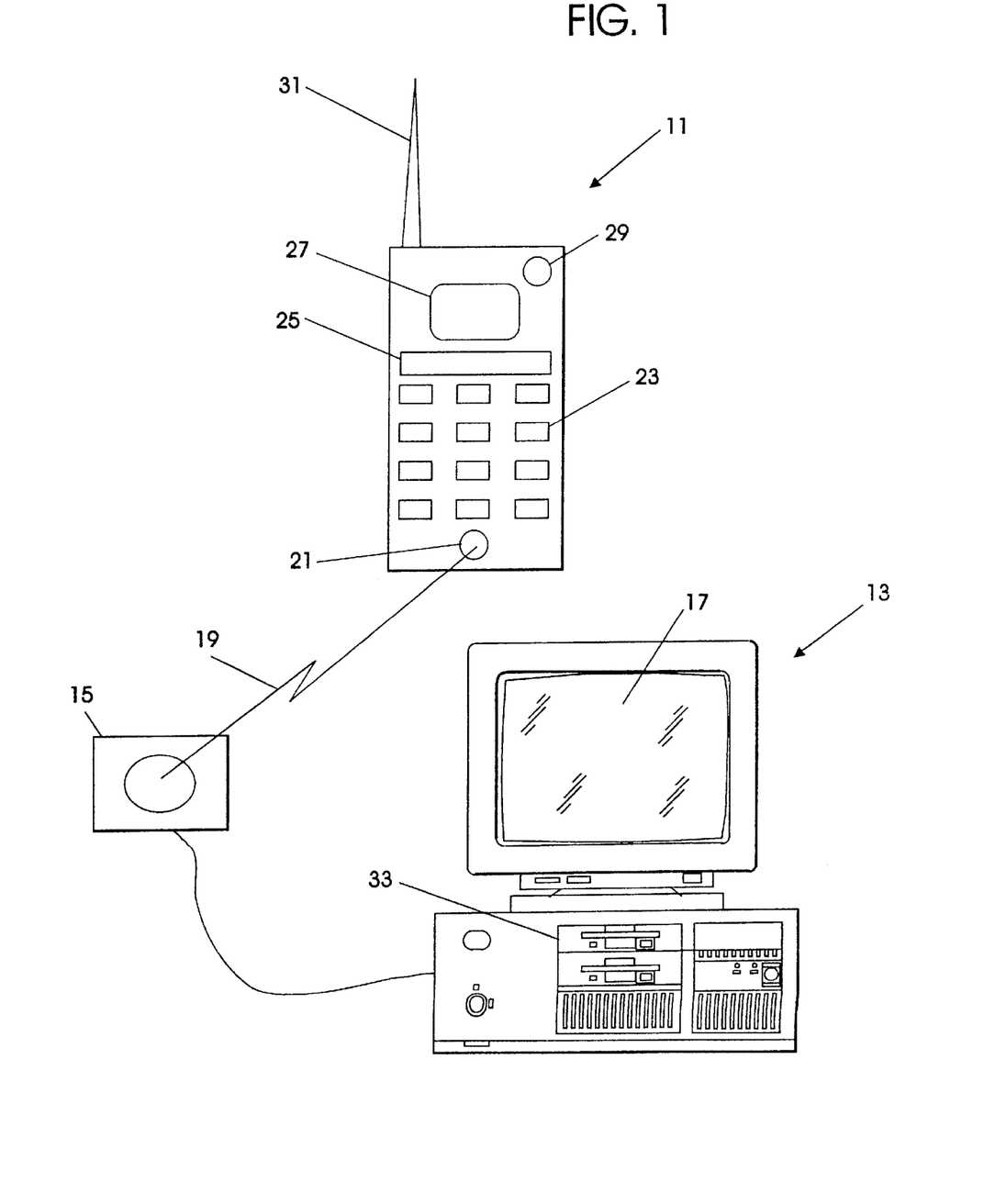
FIG. 1 illustrates a terminal for transferring a directory of telephone numbers to a cellular radiotelephone over a wireless coupling path.

As shown in FIG. 1, a telephone directory of a cellular radiotelephone 11 can be advantageously programmed using a terminal 13 with an acoustic output transducer such as a speaker 15. While the speaker 15 is shown separate from the terminal 13, those having skill in the art will understand that the speaker 15 can be included in the terminal 13. The terminal 13 is preferably a personal computer as many consumers now either own or have access to a personal computer.

An example of a directory of telephone numbers is shown below in Table 1.

TABLE 1

| 1 | Anderson, James J. | Jim | JJA | (919) 867-5309 |
|---|---|---|---|---|
| 2 | Anderson, William B. | Bill | WBA | (704) 865-7900 |
| 3 | Cox, Jonathan A. | John | JAC | (901) 986-7530 |
| 4 | Davidson, David M. | Dave | DMD | (615) 908-5367 |
| • | • | • | • | • |
| • | • | • | • | • |
| • | • | • | • | • |
| 100 | Sherman, William T. | Billy | WTS | (803) 563-7098 |

As shown, the directory of telephone numbers preferably includes a plurality of telephone numbers and associated names. Additionally, other identifiers such as sequence numbers, nicknames, or initials can be stored in the directory. Accordingly, the user of the radiotelephone 11 can use the associated name or other identifier to look up a desired telephone number.

As currently available radiotelephones may allow 100 or more telephone numbers to be stored in memory, it may be difficult to enter the directory directly into the radiotelephone. The directory, however, can be easily entered into the terminal 13 and then edited if desired. The terminal preferably includes a full keyboard to facilitate entry and editing of the directory. Alternately, a mouse, a joystick, or other input devices can be used to enter and edit the directory of telephone numbers. The screen 17 of the terminal 13 allows multiple names and telephone numbers from the directory to be viewed simultaneously thereby easing entry and editing. The terminal then converts the directory into an acoustic data signal which is output through the speaker 15.

The acoustic data signal is transmitted across the wireless acoustic coupling path 19 to an acoustic input transducer such as microphone 21 of the radiotelephone 11. Within the radiotelephone 11, a modem converts the acoustic data signal, and a processor programs the memory with the directory. The radiotelephone 11 may also include a keypad 23, a display 25, an acoustic output transducer such as speaker 27, an indicator 29, and an antenna 31.

Accordingly, the cellular telephone user can purchase the radiotelephone 11 and then easily program the internal directory of telephone numbers on a terminal 13 including a speaker 15, such as a conventional personal computer, at home. Preferably, the vendor of the radiotelephone 11 provides or sells software for running the terminal 13 when the phone is sold. For example, the vendor can provide the software on inexpensive magnetic disks which are compatible with a disk drive 33 of the terminal 13. This software can facilitate the entry, editing, and transfer of the telephone directory from the terminal 13 to the radiotelephone 11. The directory can also be easily saved at the terminal, changed at a later time, and reprogrammed into the radiotelephone if the user later wishes to add or subtract one or more entries.

The use of the wireless acoustic coupling path 19 allows the directory to be transferred without requiring additional hardware features on the radiotelephone 11. That is, since all radiotelephones include a microphone, acoustic data can be received without adding a new part. The modem can be implemented in the radiotelephone 11 by reprogramming existing hardware. Accordingly, the radiotelephone of the present invention can be produced without significantly increasing manufacturing costs or size. Furthermore, additional user programmable data, such as a password, a greeting, a keypad lock, service carrier information, ring tone, display language, etc., can be programmed in this manner. Alternately, the data can be transferred via an infrared or optical coupling. For example, the terminal can include an infrared transmitter, and the radiotelephone can include an infrared receiver.

The terminal can also include an acoustic input transducer such as a microphone allowing the transfer of data back from the radiotelephone to the terminal via an acoustic path from the radiotelephone speaker to the terminal microphone. The radiotelephone can download its telephone directory to the terminal, where the directory can be edited and then reprogrammed into the radiotelephone. Accordingly, the user does not need to save the telephone directory at the terminal to later edit and reprogram the telephone directory in the radiotelephone.

While UK Patent Application No. 2,256,113A discusses programming set-up data into the memory of a cellular telephone, this patent application does not relate to the programming of user programmable data in general or the programming of a directory of telephone numbers in particular. The UK '113A Patent Application relates to the programming of function data such as the subscriber's number, the communication area and/or system within which the mobile telephone will be used, the retailer and/or installer code, the date of installation, and any similar data necessary for the use of the mobile telephone. Furthermore, this function data is loaded using a computer terminal located at a central location which is coupled via a link such as a telephone network. In this way, only a few of the more expensive programming devices are required, where an expert programmer is available when required for more special programming needs. Accordingly, the UK '113A Patent Application does not teach or suggest entering a directory of telephone numbers into a terminal and then transferring the directory to a radiotelephone, thereby allowing the user to easily program, reprogram, and edit the directory of telephone numbers in the radiotelephone.

Figure 2:
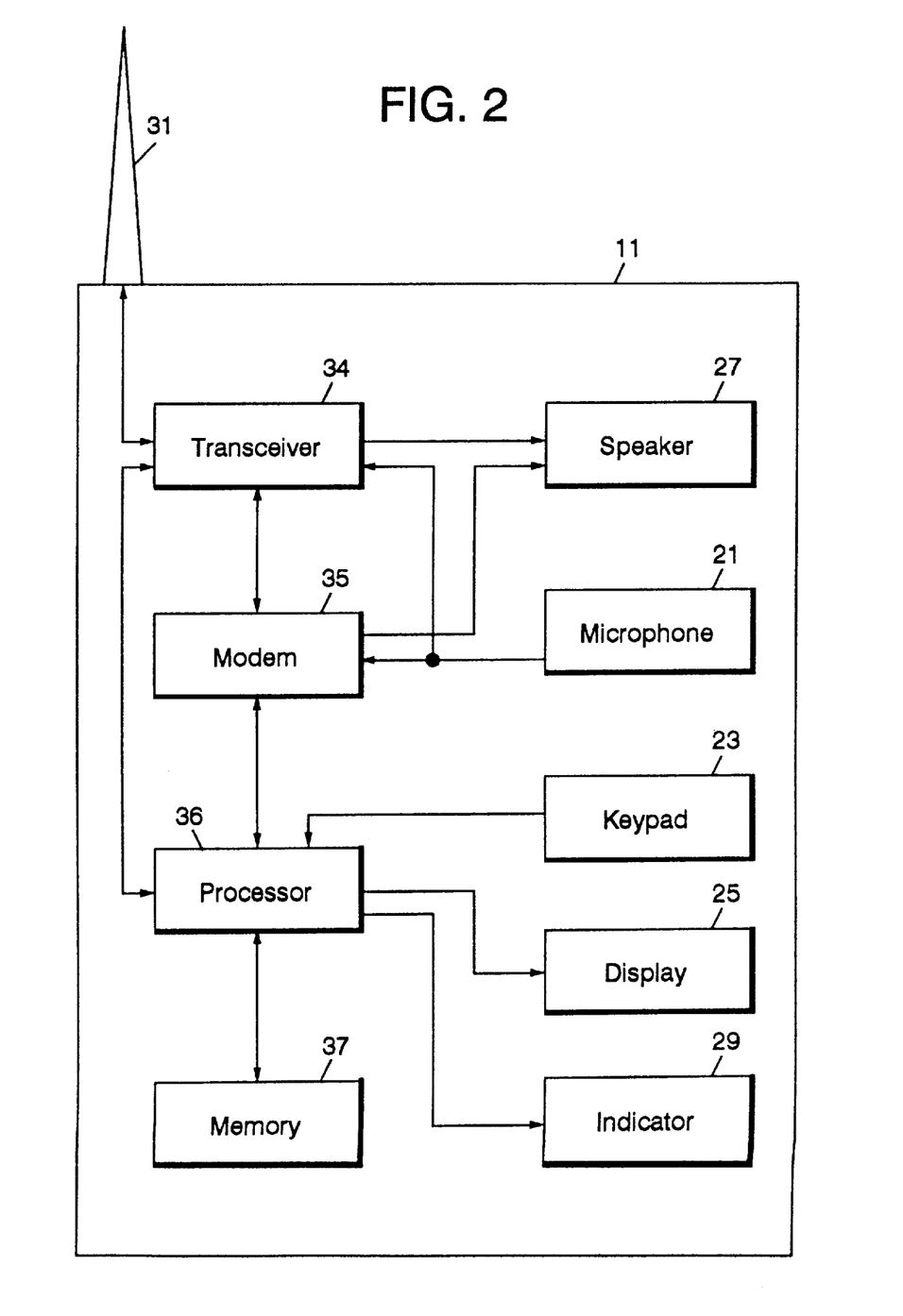
FIG. 2 illustrates a schematic diagram of a radiotelephone according to FIG. 1.

A schematic diagram of the cellular radiotelephone 11 of FIG. 1 is illustrated in FIG. 2. In addition to the external features shown in FIG. 1, the radiotelephone 11 includes a transceiver 34, a modem 35, a processor 36, and memory 37. As will be understood by one having skill in the art, the transceiver 34 sends and receives radio frequency signals through antenna 31 to and from a cellular base station thereby providing remote telephone communications. The transceiver 34 interacts with the speaker 27 and microphone 21 to provide two way voice communications. As in a conventional radiotelephone, the processor 36 controls the operation of the transceiver 34, receives data from the keypad 23, and sends data to the display 25 which is typically an LCD display.

The modem 35 is used during the programming operations of the present invention to accept the acoustic data signals received by the microphone 21 and translate these acoustic data signals to electronic data signals which can be understood by the processor 36. The processor 36 is then able to program memory 37 with the directory of telephone numbers or other user programmable data. If a test data pattern is successfully received and verified, the processor 36 can instruct the indicator 29 to indicate verification. For example, the indicator 29 can be a light which comes on when the test data pattern is verified. Alternately, verification can be provided visually on the display 25, or audibly through the speaker 27.

Figure 3:
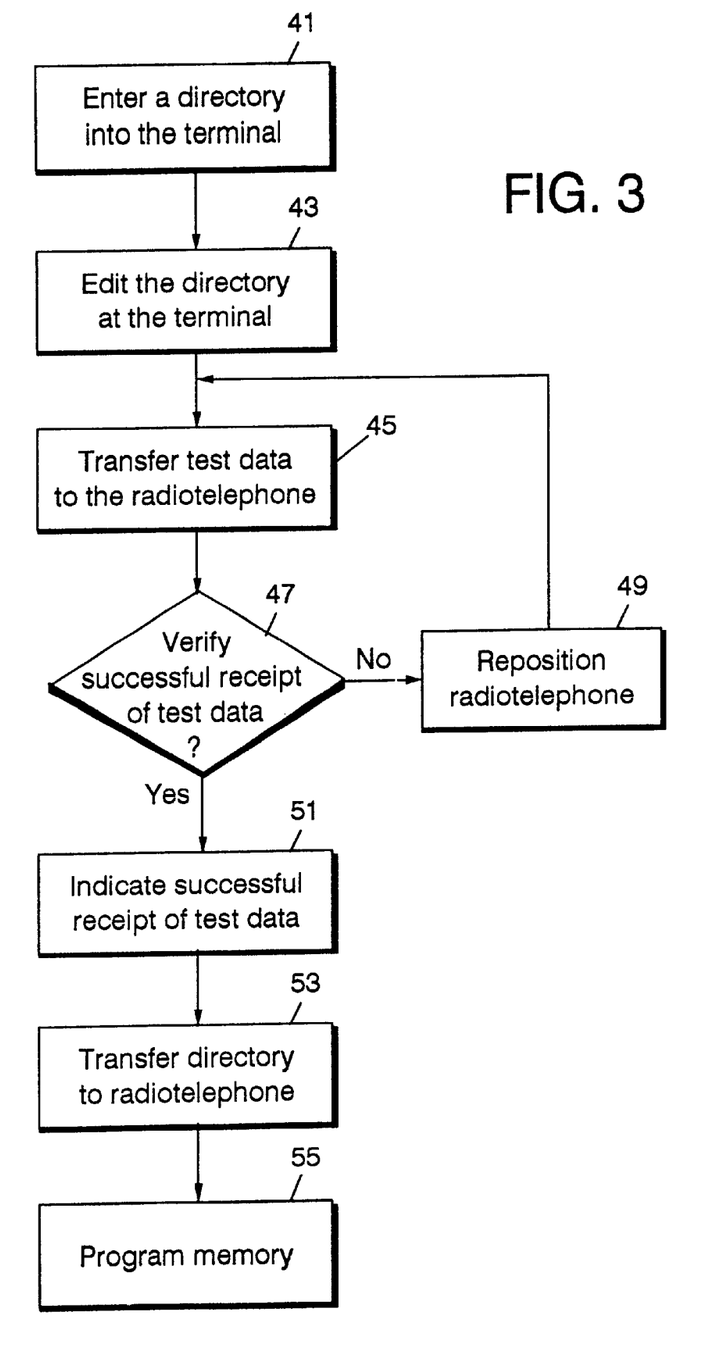
FIG. 3 illustrates operations for transferring the directory of telephone numbers to the radiotelephone of FIG. 1.

Operations for programming the directory of the cellular radiotelephone 11 using the terminal 13 of FIG. 1 are illustrated in FIG. 3. The terminal 13, such as a personal computer, can be configured to program the radiotelephone 11 by loading the appropriate software using disk drive 33. The computer can then prompt the user through the steps required to program the radiotelephone 11.

The user first enters the directory of telephone numbers into the terminal 13 through input means such as a keyboard, a mouse, a joystick, etc. at block 41. The directory preferably includes a plurality of telephone numbers and associated names represented as groups of alpha-numeric characters. The directory can also include other identifiers as previously discussed. This directory can be viewed on the screen 17 and edited if mistakes have been made or changes are desired at block 43.

The radiotelephone 11 is then placed relatively close to the speaker 15 so that acoustic data can be received therefrom. The terminal 13 can then transfer a known test data pattern to the radiotelephone to verify coupling between the speaker 15 and the microphone 21 over the wireless acoustic coupling path 19 at block 45. For example, a function key on the radiotelephone 11 can be used to enter a test mode, and a menu choice on screen 17 can be used to initiate the test. If the test data pattern is successfully received, the radiotelephone 11 indicates successful receipt visually through either the standard display 25 or a dedicated indicator 29, or audibly through speaker 27 at blocks 47 and 51. Alternately, the radiotelephone 11 can be repositioned relative to the speaker 15, and the transfer of the test data pattern repeated at blocks 47, 49, and 45, or the test data pattern can be resent at a slower transmission rate.

Furthermore, the test data pattern can be sent at three progressively slower transmission rates with the radiotelephone indicating at which transmission rates the test data was successfully received. The user can then input the highest acceptable transmission rate into the terminal before transferring the telephone directory. Alternately, if the terminal includes a microphone, the radiotelephone can transmit the highest acceptable transmission rate directly to the terminal via the acoustic path from the radiotelephone speaker to the terminal microphone.

The directory of telephone numbers can then be transferred to the radiotelephone 11 at block 53. A checksum is preferably transferred with the directory to ensure data integrity. The directory of telephone numbers is programmed into the cellular radiotelephone memory at block 55. The directory of telephone numbers can also be stored on a disk at the terminal 13. Accordingly, when the user later wishes to add, delete, or edit an entry in the directory, the old directory can be easily retrieved, edited, and transferred to the radiotelephone.

Figure 4:
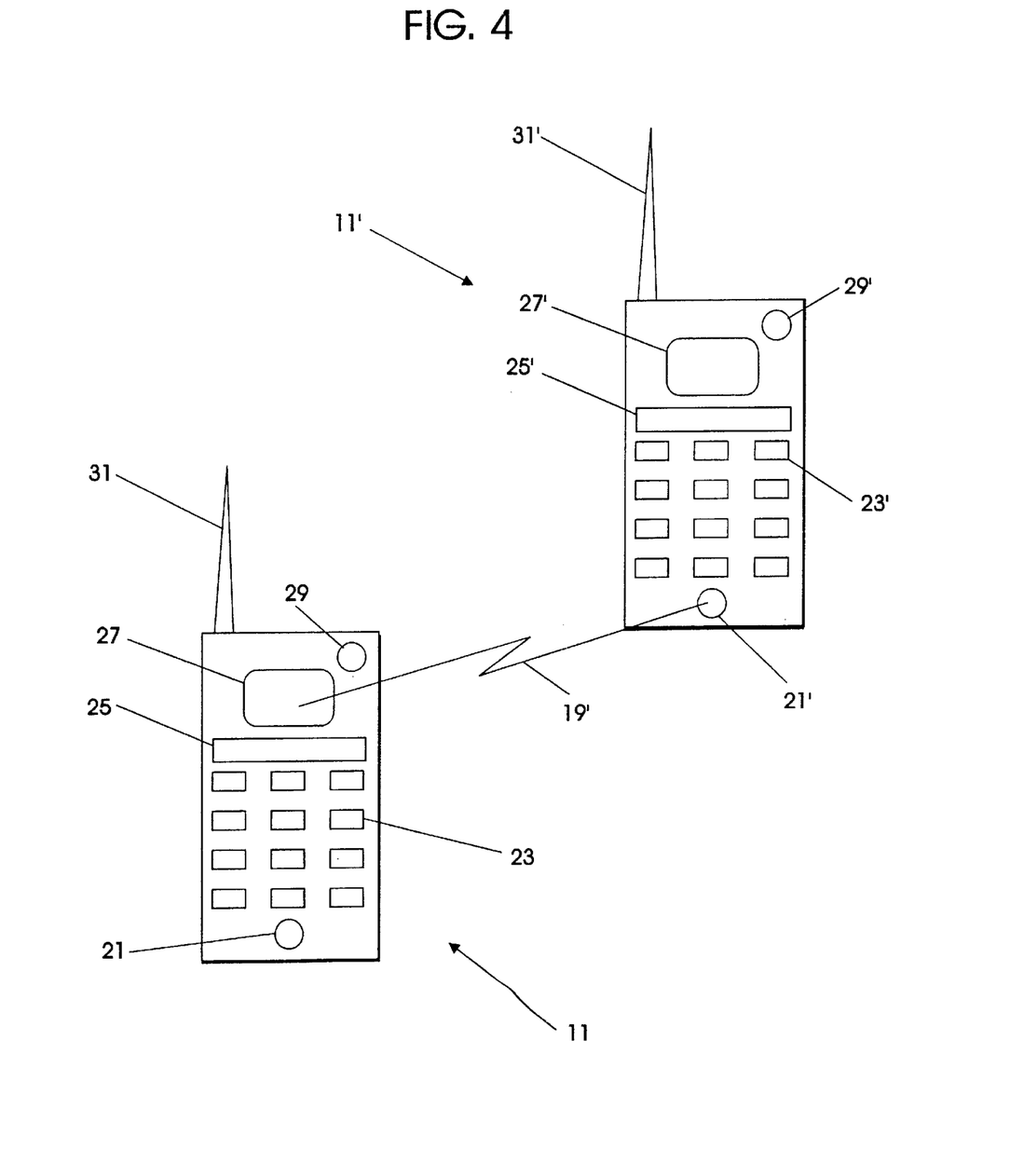
FIG. 4 illustrates a first radiotelephone for transferring a directory of telephone numbers to a second radiotelephone.

Alternately, a radiotelephone 11' can be programmed with a directory of telephone numbers by copying the directory from another radiotelephone 11 as shown in FIG. 4. In this example, radiotelephone 11 has been previously programmed with a directory of telephone numbers either directly through keypad 23 or through other means such as a terminal as shown in FIG. 1. To transfer this directory to radiotelephone 11', the directory of telephone numbers is read from memory, processed through an acoustic modem, transmitted by speaker 27 over wireless acoustic coupling path 19', and received by microphone 21' on radiotelephone 11'. Radiotelephone 11' then processes the data as discussed above with regard to FIGS. 1–3. Thus, when a user owns two phones (e.g. one car phone and one portable phone), he can transfer the directory of telephone numbers from one to the other. Alternately, the directory can be transferred between two radiotelephones via an infrared or optical coupling. For example, each radiotelephone can include an infrared transmitter and receiver.

The features of radiotelephone 11 which allow it to transmit the directory over the wireless acoustic coupling path 19' are illustrated in FIG. 2. As shown, the modem 35 is coupled to speaker 27 as well as microphone 21 and processor 36. Accordingly, the processor 36 can read the directory of telephone numbers from memory 37 and provide this directory to the modem 35. The modem 35 in turn generates the data signal which is transmitted by the speaker 27 over the wireless acoustic coupling path 19'.

A function key on keypad 23 can be used to set the radiotelephone 11 in a mode to transmit its directory of telephone numbers while another key on keypad 23' can be used to set radiotelephone 11' in a mode to receive the directory. In addition, a known test data pattern can be sent to confirm coupling of speaker 27 and microphone 21' prior to transmitting the directory of telephone numbers. As before, display 25', visual indicator 29', or speaker 27' can be used to verify proper receipt of the test data pattern. If proper receipt is not verified, speaker 27 and microphone 21' can be moved closer together and the test data pattern sent again.

Figure 5:
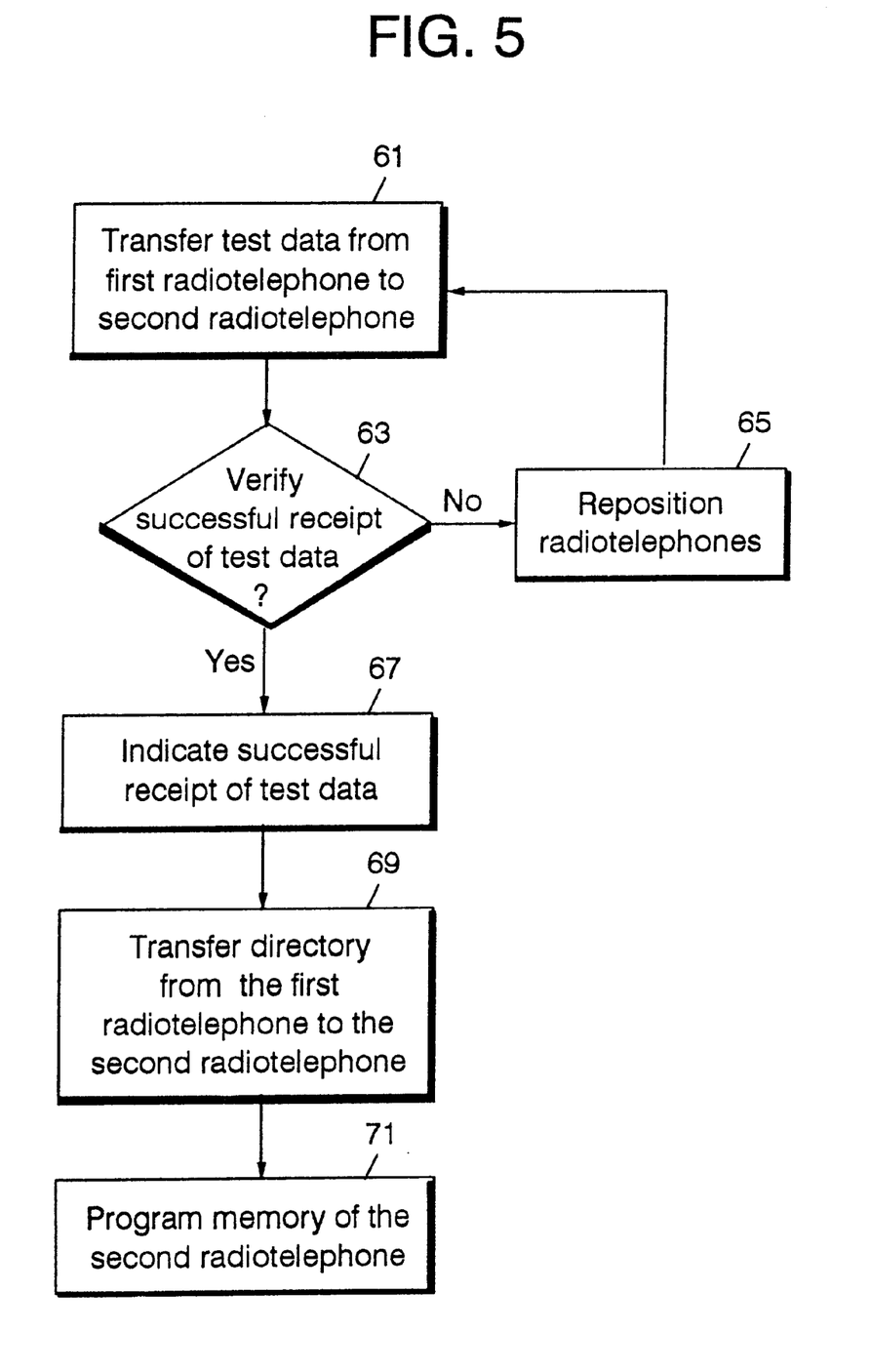
FIG. 5 illustrates operations for transferring a directory of telephone numbers between the radiotelephones of FIG. 4.

Operations for copying a directory of telephone numbers from a first radiotelephone 11 to a second radiotelephone 11' are illustrated in FIG. 5. As discussed above, each of the radiotelephones can be set to respectively transmit or receive over the wireless acoustic coupling path 19' by pressing appropriate function keys. The copying preferably begins by transferring a known test data pattern from the first radiotelephone 11 to the second radiotelephone 11' via the wireless acoustic coupling path 19' at block 61. If successful receipt of the data pattern is verified at the second radiotelephone 11' at block 63, the second radiotelephone 11' can indicate such through display 25', speaker 27', or indicator 29' at block 67. Alternately, the radiotelephones can be repositioned at block 65, and the test data resent.

The directory of telephone numbers can then be transferred from the first radiotelephone 11 to the second radiotelephone 11' at block 69. In particular, the directory of telephone numbers is read from memory by the processor and provided to the modem where it is converted to an acoustic data signal which is transmitted from the speaker 27 across the wireless acoustic coupling path 19'. The acoustic data signal is received at the microphone 21' of the second radiotelephone 11'. As before, the signal is processed through the modem of the second radiotelephone and programmed into memory at block 71. Accordingly, the directory of telephone numbers from one radiotelephone can be copied into another radiotelephone without programming the second radiotelephone through the keypad. While there has been discussed the copying of a directory of telephone numbers from one telephone to another, those having skill in the art will understand that any other user programmable data can be copied according to the present invention.

In the drawings and specification, there have been disclosed typical preferred embodiments of the invention and, although specific terms are employed, these terms are used in a generic and descriptive sense only and not for purposes of limitation, the scope of the invention being set forth in the following claims.

That which is claimed:

1. A method for providing a directory of telephone numbers to a cellular radiotelephone comprising the steps of:
    entering the directory of telephone numbers into a terminal;
    transferring the directory of telephone numbers from said terminal to said cellular radiotelephone via a wireless coupling wherein said wireless coupling comprises an acoustic coupling between an acoustic output transducer of said terminal and an acoustic input transducer of said cellular radiotelephone: and
    programming the transferred directory of telephone numbers into a memory of said cellular radiotelephone.

2. A method according to claim 1 wherein said transferring step is preceded by the steps of:
    transferring a known test data pattern from said terminal to said cellular radiotelephone via said wireless coupling; and
    indicating successful receipt of the known test data pattern at said cellular radiotelephone to confirm operation of said wireless coupling prior to transferring the directory of telephone numbers.

3. A method according to claim 1 wherein said transferring step is preceded by the step of editing said entered directory of telephone numbers at said terminal.

4. A method according to claim 1 wherein the directory of telephone numbers comprises a plurality of telephone numbers and a plurality of groups of alpha-numeric characters wherein each of the groups of alpha-numeric characters corresponds to a respective one of the telephone numbers.

5. A method for providing a directory of telephone numbers to a cellular radiotelephone comprising the steps of:
    entering the directory of telephone numbers into a terminal;
    transferring the directory of telephone numbers from said terminal to said cellular radiotelephone via a wireless coupling;
    transferring the directory of telephone numbers from said terminal to said cellular radiotelephone via a wireless coupling; and
    programming the transferred directory of telephone numbers into a memory of said cellular radiotelephone;
    wherein said transferring step is preceded by the steps of,
    transferring a known test data pattern from said terminal to said cellular radiotelephone via said wireless coupling;
    indicating successful receipt of the known test data pattern at said cellular radiotelephone to confirm operation of said wireless coupling prior to transferring the directory of telephone numbers; and
    wherein said indicating step comprises providing one of an audible and a visible indication of successful receipt at said cellular radiotelephone for verification by a user.

6. A method for providing a directory of telephone numbers to a cellular radiotelephone comprising the steps of:
    entering the directory of telephone numbers into a terminal;
    transferring the directory of telephone numbers from said terminal to said cellular radiotelephone via a wireless coupling; and
    programming the transferred directory of telephone numbers into a memory of said cellular radiotelephone;
    wherein said terminal comprises a personal computer including an acoustic output transducer.

7. A system for programming a directory of telephone numbers into a cellular radiotelephone, said computer system comprising:
    input means for accepting entry of the directory of telephone numbers by a user;
    processing means for converting the directory of telephone numbers into a data signal which can be transferred to the cellular radiotelephone; and
    wireless coupling means for transferring the data signal including the directory of telephone numbers from said computer system to the cellular radiotelephone where the directory of telephone numbers can be programmed into memory of the cellular radiotelephone wherein said wireless coupling means comprises an acoustic output transducer for transmitting an acoustic data signal which can be received by an acoustic input transducer of the cellular radiotelephone.

8. A system according to claim 7 further comprising:

testing means for transferring a known test data pattern to the cellular radiotelephone.

9. A system according to claim 7 further comprising editing means for accepting editing of the directory of telephone numbers by the user.

10. A system according to claim 7 wherein the directory of telephone numbers comprises a plurality of telephone numbers and a plurality of groups of alpha-numeric characters wherein each of the groups of alpha-numeric characters corresponds to a respective one of the telephone numbers.

11. A method for copying user programmable data from a first memory of a first cellular radiotelephone to a second memory of a second radiotelephone comprising the steps of:

wirelessly transferring the user programmable data from said first cellular radiotelephone via a wireless coupling;

wirelessly receiving the user programmable data at said second radiotelephone via the wireless coupling; and programming said second memory of said second radiotelephone with the user programmable data;

wherein said wirelessly transferring step comprises the steps of converting the user programmable data in said first cellular radiotelephone to an acoustic data signal, and transmitting the acoustic data signal from an acoustic output transducer of said first cellular radiotelephone.

12. A method according to claim 11 wherein said wireless receiving step comprises the steps of:

receiving the acoustic data signal at an acoustic input transducer of said second radiotelephone; and reconverting the received acoustic data signal back to the user programmable data within said second radiotelephone.

13. A method according to claim 11 wherein said user programmable data comprises a directory of telephone numbers.

14. A method for copying user programmable data from a first memory of a first cellular radiotelephone to a second memory of a second radiotelephone comprising the steps of:

wirelessly transferring a known test data pattern from said first cellular radiotelephone to said second radiotelephone via said wireless coupling;

indicating successful receipt of said data pattern at said second radiotelephone to confirm operation of said wireless coupling prior to transferring the user programmable data;

wherein the steps of wirelessly transferring the known test data pattern and indicating successful receipt are followed by wirelessly transferring the user programmable data from said first cellular radiotelephone via a wireless coupling;

wirelessly receiving the user programmable data at said second radiotelephone via the wireless coupling; and programming said second memory of said second radiotelephone with the user programmable data.

15. A method according to claim 14 wherein said indicating step comprises providing one of an audible and a visible indication of successful receipt at said second radiotelephone for verification by a user.

16. A cellular radiotelephone comprising:

an acoustic output transducer for generating acoustic energy in response to an input audio electrical signal;

a transceiver for receiving the input audio electrical signal and for transmitting an output audio electrical signal over radio frequency channels;

a memory for storing a directory of telephone numbers;

wireless coupling means for receiving the directory of telephone numbers; and processor means for programming the directory of telephone numbers in said memory;

wherein said wireless coupling means comprises an acoustic modem coupled to an acoustic input transducer for receiving an acoustic data signal including the directory of telephone numbers.

17. A cellular radiotelephone according to claim 16 further comprising indicating means for indicating successful receipt of a known test data pattern to confirm operation of said wireless coupling.

18. A cellular radiotelephone according to claim 16 wherein the directory of telephone numbers comprises a plurality of telephone numbers and a plurality of groups of alpha-numeric characters, wherein each of the groups of alpha-numeric characters corresponds to a respective one of the telephone numbers.

19. A cellular radiotelephone comprising:

an acoustic output transducer for generating acoustic energy in response to an input audio electrical signal;

a transceiver for receiving the input audio electrical signal and for transmitting an output audio electrical signal over radio frequency channels;

a memory for storing a directory of telephone numbers;

wireless coupling means for receiving the directory of telephone numbers;

processor means for programming the directory of telephone numbers in said memory; and indicating means for indicating successful receipt of a known test data pattern to confirm operation of said wireless coupling wherein said indicating means comprises one of an audible and a visual indicator.

* * * * *